(No Model.)
R. T. HALL.
SHIP'S LOG.
No. 473,222. Patented Apr. 19, 1892.
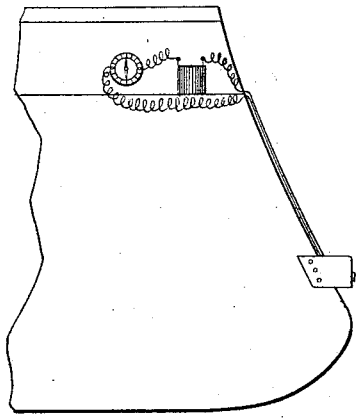
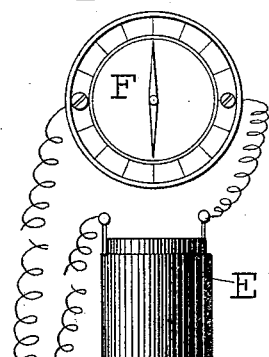
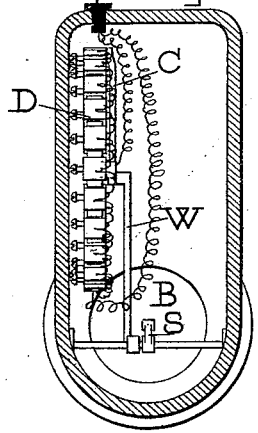
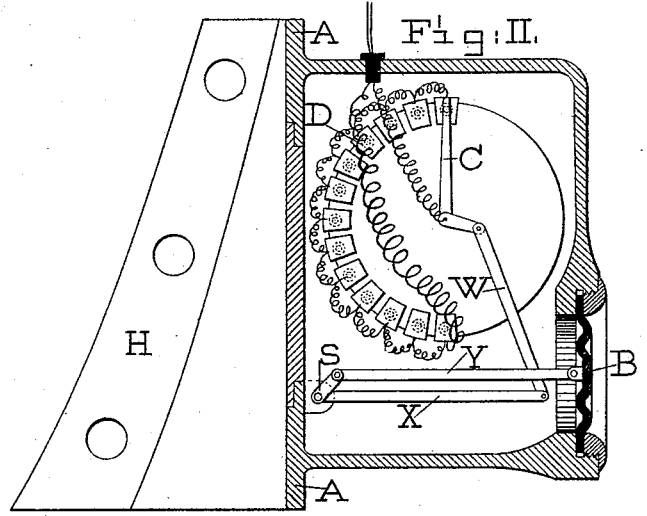
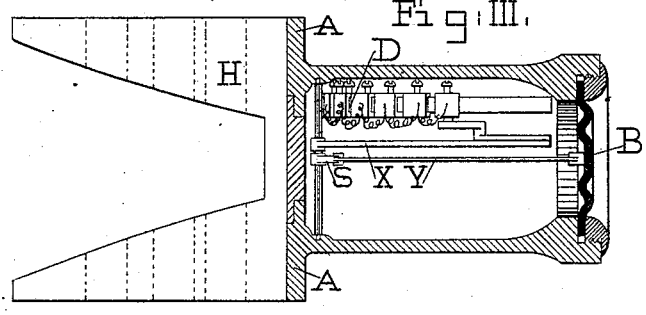
Witnesses:
Oscar F. Hill
Edward F. Allen
Inventor.
Reynold T. Hall.
by Crosby & Gregory Attys.

United States Patent Office.

REYNOLD THOMAS HALL, OF MERCHANTVILLE, NEW JERSEY.

SHIP'S LOG.

SPECIFICATION forming part of Letters Patent No. 473,222, dated April 19, 1892.

Application filed September 7, 1891. Serial No. 405,040. (No model.)

*To all whom it may concern:*

Be it known that I, REYNOLD THOMAS HALL, passed assistant engineer in the United States Navy, (at present on board the United States flag-ship *Pensacola*, at anchor in the harbor of Valparaiso, Chile,) a citizen of the United States, residing at Merchantville, in the county of Camden and State of New Jersey, have invented a certain new and useful machine for applying a principle in hydrostatics to the measurement of the speed of vessels through the water; and I do hereby declare the following to be a full, clear, and exact description of my invention, such as will enable others skilled in the art to which it belongs to apply and use the same.

My invention relates to an improved automatic ship's speed-gage or ship's log utilizing a hydrostatic principle of "motion of bodies in fluids," namely: "Resistance to a plane from a fluid acting in a direction at right angles to its face is equal to the weight of a column of fluid the base of which is equal in area to the plane and the altitude equal to that which is due to the velocity of the motion or through which a heavy body must fall to acquire that velocity, and resistance to a plane moving through a fluid is the same as the force of fluid in motion, with same velocity on plane at rest." The resistance per square foot of area sustained by a wholly-submerged plane moving normally to itself through sea-water at a uniform speed of ten feet per second is one hundred and twelve pounds, and for other speeds the resistances vary as the squares of the speeds. Thus, let V represent any velocity in feet per second and R the resistance per square foot due to that velocity; then, $10^2$ is to $V^2$ as is 112 to R. Conversely, by ascertaining the resistance to a plane under the above circumstances the velocity per second and speed per hour may be calculated. The velocity may be obtained mathematically, as follows:

$$10^2 : V^2 :: 112 : R \therefore R = \frac{112\,V^2}{100} = 1.12\,V^2.$$

Let R′ represent the resistance per square inch, (upon plane;) then $$R' = \frac{R}{144} \text{ or } R' = \frac{1.12\,V^2}{144} \therefore R' = .007777\,V^2$$

and $$V^2 = \frac{R'}{.007777} \cdot V = \sqrt{\frac{R'}{.007777}} \text{ equals velocity}$$

in feet per second.

Let K represent speed (velocity) in knots per hour; then $$K = \frac{V \times 60 \times 60}{6080} = \frac{45}{76} V$$

and $$K = \frac{45}{76}\sqrt{\frac{R'}{.007777}} = \sqrt{\frac{2025}{43.745625}}$$

$$R' = \frac{45}{6.614+} \sqrt{R'} = 6.803 + \times \sqrt{R'};$$

that is, K equals $6.803\sqrt{R'}$; that is, speed in knots per hour equals 6.803 plus times the square root of the resistance per square inch on the submerged plane.

The objects of my invention are, first, to provide an automatic gage; second, to secure an accurate and correct knowledge of the ship's speed through the water; third, to provide for the indications being read at any convenient place about the vessel remote from the spot where the gage is located; fourth, to measure the direct resistance per square inch due to speed upon a vessel's hull. I attain these objects by the mechanism illustrated in the accompanying drawings.

Figures I and II are the vertical sections of the gage; Fig. III, the horizontal section of the same. Fig. IV shows the electric battery and galvanometer in circuit. Fig. V shows a part of a vessel with my invention attached in circuit Similar letters refer to similar parts throughout the several views.

The "hatched" portions in Figs. I, II, and III show the sections of the chamber, which is secured by its flanges A A A to a suitable form made for the purpose, H, which is itself secured to the vessel.

In a recess in the front side of the chamber is secured the flexible diaphragm B, to the inside of which is connected the lever necessary for transmitting the motion of the flexible diaphram, and by which the movable pole C of an electric resistance-coil D is moved in such manner that the amount of electric current passing through the resistance-coil D will be increased or decreased as the amount of pressure on the diaphragm B is increased or decreased.

Connected in circuit are the resistance-coils D, the electric battery E, and an electric indicating device or galvanometer F. Any pressure coming upon the diaphragm B will successively, through lever Y, crank S, lever X, and lever W, come upon the movable pole C of the resistance-coil D, which in turn will increase or decrease the amount of current flowing through the electric circuit in which the resistance-coil D is located.

The variations in the amount of current are measured, as herein shown, by a galvanometer F, and the change in amount of current passing through the circuit at any instant will depend upon the deflection of the diaphragm B, which deflection is entirely due to the "resistance" or pressure upon it.

I am aware that prior to my invention "ship's logs" and "speed-gages" have been invented, depending upon the forward and aftward motion of the vessel through the water, and therefore do not claim the utilization of that principle, broadly; but What I do claim as my invention, and desire to secure by Letters Patent, is—

1. In a hydrostatic ship's log, the combination, with a flexible diaphragm below the water-line of the vessel and in direct contact with the water, of a resistance-coil, its pole-piece, connections between said pole-piece and diaphragm, whereby movement of the latter causes a variation of resistance, an electric generator, and an indicating device for the variations of resistance, the said generator, indicating device, coil, and pole-piece being in electric circuit, substantially as and for the purpose described.

2. A hydrostatic ship's log comprising a chamber having a flexible diaphragm therein below the water-line of and at right angles to the course of the vessel, the outer side of said diaphragm being acted upon directly by the water, a resistance, its movable pole-piece, an electric generator, and an indicating device in electric circuit with said pole-piece and resistance, and connections between said pole-piece and diaphragm, whereby movement of the diaphragm is communicated to the pole-piece, substantially as and for the purpose described.

3. In a ship's log, the combination, with a flexible diaphragm in contact with the water below the water-line of the vessel, of a resistance coil having a series of contacts, a partially-rotatable pole-piece adapted to move over said contacts, connections between said pole-piece and diaphragm to move the former, an electric generator, and a galvanometer in circuit with said generator, resistance-coil, and pole-piece, substantially as described.

REYNOLD THOMAS HALL.

Witnesses:
OLIVER L. HALL,
GEO. H. BARBER.